United States Patent [19]

Okoshi

[11] Patent Number: 4,718,294
[45] Date of Patent: Jan. 12, 1988

[54] RATIO CONTROL SPOOL VALVE FOR A TOROIDAL TYPE INFINITELY VARIABLE TRACTION ROLLER TRANSMISSION

[75] Inventor: Hideo Okoshi, Fujisawa, Japan

[73] Assignee: Nippon Seiko Kabushiki Kaisha, Tokyo, Japan

[21] Appl. No.: 833,822

[22] Filed: Feb. 26, 1986

[30] Foreign Application Priority Data

Feb. 28, 1985 [JP] Japan .................. 60-37566
Feb. 28, 1985 [JP] Japan .............. 60-27233[U]

[51] Int. Cl.⁴ ......................................... F16H 15/12
[52] U.S. Cl. ........................................ 74/190.5; 74/200
[58] Field of Search ............ 74/190.5, 199, 200, 74/201, 207, 208

[56] References Cited

U.S. PATENT DOCUMENTS

| | | | |
|---|---|---|---|
| 3,810,398 | 5/1974 | Kraus | 74/200 |
| 3,828,618 | 8/1974 | Sharpe et al. | 74/200 |
| 4,056,989 | 11/1977 | Shaffer | 74/200 X |
| 4,086,820 | 5/1978 | Kraus et al. | 74/200 |
| 4,126,052 | 11/1978 | Jackman | 74/200 |
| 4,275,610 | 6/1981 | Kraus | 74/201 X |
| 4,434,675 | 3/1984 | Kraus | 74/200 |
| 4,444,068 | 4/1984 | Kraus | 74/200 |
| 4,484,487 | 11/1984 | Kraus | 74/199 X |
| 4,576,055 | 3/1986 | Kraus | 74/190.5 X |
| 4,638,691 | 1/1987 | Tanaka | 74/190.5 |

Primary Examiner—Allan D. Herrmann
Attorney, Agent, or Firm—Arnold S. Weintraub

[57] ABSTRACT

A spool valve for changing transmission ratio for a toroidal type infinitely variable transmission is composed of, a valve housing tightly attached to a fixed member and leaving internal fluid passages, a spool is disposed in the housing and is slidable in an axial direction so as to confront with the various fluid passages to control the supply of pressurized fluid, and a cam follower made as a discrete member from the spool is disposed between the spool and a cam face to reduce the amount of displacement of the spool. The relative position of the spool with respect to the fluid passages is changed by a transmission ratio setting means to prevent the valve housing itself from displacing during the transmission ratio controlling operation.

6 Claims, 13 Drawing Figures

MAXIMUM DECELERATING POSITION

MAXIMUM ACCELERATING POSITION

FIG.8

DECELERATING SIDE

ACCELERATING SIDE

ROTATIONAL ANGLE OF PRECESS CAM

FIG.13 though the scope of this invention is defined in appended claims, a summary of the essential elements of this invention will be described as follows:

RATIO CONTROL SPOOL VALVE FOR A TOROIDAL TYPE INFINITELY VARIABLE TRACTION ROLLER TRANSMISSION

BACKGROUND OF THE INVENTION

1. Field of the Invention:

This invention relates to a ratio control spool valve means for adjusting the transmitting motion of a toroidal type infinitely variable traction roller transmission, namely by adjusting the pivoting angle of a pair of opposing power rollers disposed between and in rotative engagement with opposite input and output toric discs.

2. DESCRIPTION OF THE PRIOR ART:

Heretofore, there is a speed controlling means for an infinitely variable transmission such as disclosed in U.S. Pat. No. 4,434,675.

The aforesaid patent relates to a toroidal type infinitely variable transmission which includes; a pair of opposing input and output discs each disposed on input and output shaft, respectively, and define a toroidal cavity therebetween. A pair of motion transmitting power rollers are disposed between the input and output discs and in engagement therewith. A pair of roll support structures each supports a roller and is movable in a direction along of its own pivot axis. A fluid operated actuating means is associated with the support structure for transmitting precess movement to the support structure. At least one of the power roller support structure comprises a circular cam disc connected to the support structure and capable of movement in an axial direction and rotation with the support structure. A main control valve is associated with the circular cam disc and has a control member and a cam follower which contacts the circular cam disc. The main control valves a connected to a pressurized fluid source and to each of the hydraulic operating members for supplying the pressurized fluid to the hydraulic operating members, or releasing hydraulic fluid therefrom when the cam follower is not in a predetermined position. By virtue of this construction, the device of the U.S. Patent, due to the mechanical feedback mechanism constituted by the combination of circular cam disc connected to the power roller support structure and the main control valve cam follower engaging the cam face of the cam disc, can control the transmission ratio in toroidal type infinitely variable transmission means in a very steady manner and by relying on a very simple construction.

However, in the transmission according to the aforesaid U.S. Patent, transmission ratio control is made in such a manner that all instruction signal for rotating and axially moving the support structure is given to the cam follower which engages the cam disc connected to the power roller support structure, and the valve housing is slidably disposed on a threaded support post. Thus, the instruction signal is given by axially moving the valve housing, namely, the valve housing itself has to be moved along the support post. Accordingly, the oil distribution pipings connected to the valve housing have to be made flexible so as to follow the movement of the valve housing, in addition, a relatively large space is required to allow the movement of the valve housing and flexing of the pipings.

Moreover, because the spool in the main valve engages the cam face of the cam disc through a cam follower integral with the spool, the spool is urged to move in response to the rotation and axial movement of the cam disc during the operation. Stroke of the spool travel must be made large enough to avoid its abnormal motion, and yet the stroke of the valve housing also had to be made large.

If the power roller support structure stops either at the upper end or lower end of its stroke at a condition where infinitely variable transmission is in a maximum accelerating position, if an operator moves the valve housing to its maximum decelerating position by a transmission ratio change action, and tries to start the vehicle or other machine, then the necessary stroke S for the spool to shift the power roller to the decelerating side is expressed by a formula mentioned below;

$$TS = S_1 + S_2 + S_3 \tag{1}$$

where
- $S_1$ is the cam lift within the range of transmission change,
- $S_2$ is the valve stroke for preventing abnormal valve action, and
- $S_3$ is the moving stroke of the roller support structure;

For example, if the cam lift $S^1$ is 6.5 mm, valve stroke S is 0.5~1.0 mm and the stroke of the support structure $S_3$ needs 2 mm at one side, then the total stroke TS becomes 9.5 mm, which is a very large value as compared with ordinary spool valves.

If the necessary stroke TS becomes very large, since the weight of the spool will also become large as the length of the spool becomes longer, then the biasing force of the spool to the precess cam also has to be increased to secure stable valve action, and this results in lengthening of the valve housing as well as its weight. As the result, power means for driving the valve housing for performing transmission ratio change must be made larger, in addition, response characteristics of the device are also degraded due to the increased weight which also increases its cost.

OBJECT OF THE INVENTION

The present invention has been conceived in view of the aforesaid problems encountered in the prior art devices. Accordingly the present invention aims to provide a transmission ratio control spool valve means for toroidal type infinitely variable transmission capable of being constructed as small sized and light weight devices while still having good response characteristics and which can be manufactured with low cost.

SUMMARY OF THE INVENTION

According to the present invention, a valve housing incorporating therein fluid passages is fixedly attached to a fixed member. Within the valve housing, a spool is slidably disposed in axial movement so that it can overlie various fluid passages in the valve housing. A fluid operated actuating means for controlling the transmission ratio of the transmission, in addition, by means of a cam follower made being discrete with the spool and interposed between the spool and the cam disc connected to the support structure of the toroidal type infinitely variable transmission enables a reduced stroke of the spool and the spool itself can be made small in size and light weight. Furthermore, the response characteristics of the device in controlling the transmission can also be improved together with the decrease in driving power necessary for the control operation. I addition, by varying the relative position of the spool with respect to the fluid passages in the valve housing, the transmission ratio can be set with the valve housing being fixed, thereby fluid piping of rigid construction can be used for this type transmission, producing a lengthened service life.

Moreover, the transmission according to the present invention does not require any surplus space for the motion of the device and yet can reduce the total length of the spool valve itself.

In setting the transmission ratio, since the cam follower can be rotated in the direction of the extension of the inclined cam face so as to change the relative position of the fluid passages with respect to the spool, there is no need for axially moving the spool in its setting work, and yet it is also possible to maintain the position of the cam follower at constant position, that is, on neutral, regardless of set position, thereby the response characteristics in transmission control can also be greatly improved.

DESCRIPTION OF THE PREFERRED EMBODIMENTS

Figure 1:
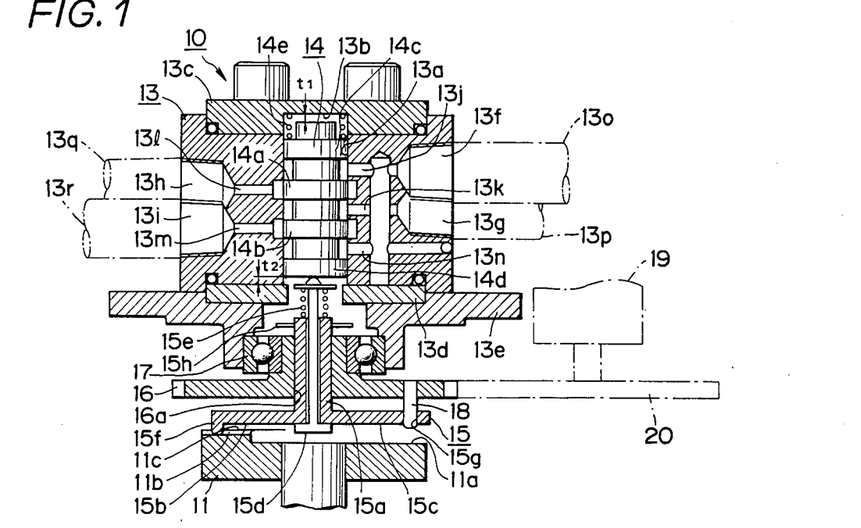
FIG. 1 is an enlarged sectional view showing an example of a spool valve for transmission according to the present invention.
Figures 2, 3:
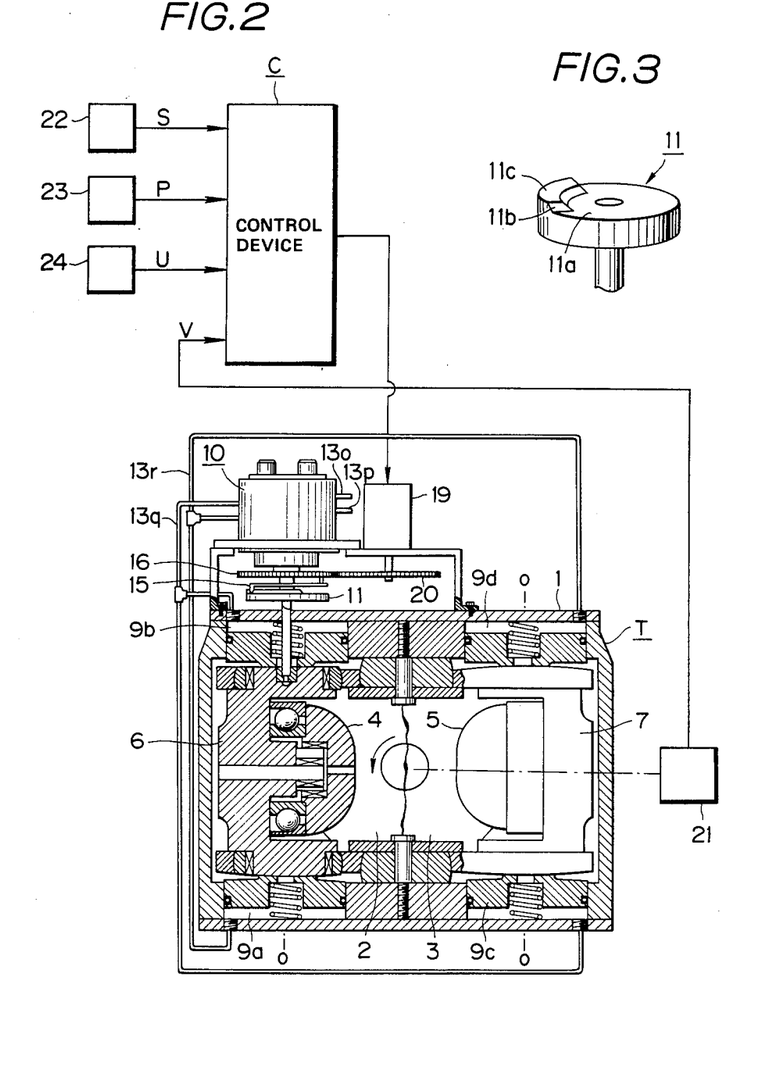
FIG. 2 is a sectional side view showing the spool valve for transmission of the present invention assembled to a toroidal disc type infinitely variable traction roller transmission.
FIG. 3 is a perspective view of a precess cam applicable to the device of the present invention.

FIGS. 1 and 2 show an embodiment of the present invention.

Explanation will be made, at first, on the overall construction of the present invention, in FIG. 2, symbols T is a toroidal type infinitely variable transmission and C is a control device, respectively.

The toroidal type infinitely variable transmission T is received in a housing 1 with its coaxial input disc 2 and output disc 3 being rotatably supported opposite one another. The input disc 2 and the output disc 3 are substantially the same in configuration and are disposed in symmetry, in other words, one is placed as a mirror image to the other, two confronting surfaces of which cooperatively define two semicircles constituting a toroidal surface seen in axial cross section. A pair of power rollers 4 and 5 are rotatably disposed being permitted for precess movement within a toroidal cavity defined between the two discs 2 and 3.

These power rollers 4 and 5 are rotatably supported on roller support structures 6 and 7, respectively, and are pivotally supported around a pivot axis 0 which forms the center of the toroidal face.

On the contact surface of the input shaft 2, the output shaft 3 and the power rollers 4 and 5, are supplied with lubricating oil having high resistance to viscous friction. The input torque applied to the input disc is transmitted through the lubricating oil film and power rollers 4 and 5 to the output disc 3, thereby the change of transmission ratio, namely, the speed change ratio is executed by changing the tilting angle 0 of the power rollers 4 and 5, by means of a small amount of displacement of the support structures 6 and 7 in the direction of the pivot axis 0—0.

The displacement of the support structures 6 and 7 is controlled by a transmission actuating mechanism consisting of a set of oil cylinders 9a to 9d disposed at both axial ends of the support structures 6 and 7, a transmission spool valve means 10 which controls the supply of pressurized hydraulic oil to these cylinders 9a through 9d, and a precess cam disc 11 formed integral with the support structure 6. In this arrangement, the precess cam 11, as shown in FIG. 3, is formed to have a flat lower cam face 11a at its upper face, an inclined cam face 11b contiguous to the lower cam face 11a and a flat upper cam face 11c contiguous to the upper end of the inclined cam face 11b. The height between the lower cam face 11a and the upper cam face 11c is selected to be substantially the same as the full stroke of the spool 14 of the transmission spool valve means 10.

The transmission spool valve 10, as shown in enlarged scale in FIG. 1, is provided, within the central opening 13a of a cylindrical valve housing 13, with a spool 14 slidable in an axial direction. On the lower end face of spool 14 a cam follower 15 engages the cam face of the precess cam 11 and is capable of both axially slidable and rotative movement.

The valve housing 13 is fitted, at its upper end, with a top cover 13c formed at its central part with a recess 13b communicating with the central opening 13a, while the lower end of housing 13 engages a bottom cover having a central opening and a mounting member 13e which is mounted to the housing 1 of the toroidal type infinitely variable transmission T.

The valve housing 13 is formed, on its side wall, with four piping sockets 13f through 13i placed in staggered relation, to each of which an oil passage 13j, 13k, 13l or 13m is bored to be in communicating with the interior by passing through the wall of the housing. The oil passage 13j has a branched oil passage 13n and the oil passages 13m and 13l are formed at the inside wall to constitute an annular groove. Oil socket 13g is connected via an oil distribution pipe 13p to a pressurized oil source and the oil socket 13f is connected via an oil distribution pipe 13o to an oil supply tank. Socket 13h is connected to the oil cylinder 9b and 9c of the toroidal type infinitely variable transmission T via a distribution pipe 13q, while the socket 13i is connected through a distribution pipe 13r to the oil cylinder 9a and 9d of the toroidal type transmission T, respectively.

The spool 14 is provided with two lands 14a and 14b each having a width dimensioned to close the annular groove 13l and of the valve housing 13 and further lands 14c and 14d each of which formed at the axially outer part of the aforesaid two lands spaced apart at a predetermined distance. Axial movement of the spool 14 is restricted by the top cover 13c and the bottom cover 13d. Spool 14 is biased downward by a spring 14e interposed between the top cover 13c and the land 14c.

The cam follower 15 has a cylindrical member 15a and two arms 15b and 15c symmetrically extending radially outwardly from its lower end. A pin 15d having a pointed top end is slidably inserted within the cylindrical member 15a, and a spring 15e is disposed between the pin 15d and the upper face of the cylindrical member 15a. A downwardly extending contacting piece 15f is integrally formed at the free end of the arm 15c, while the other end of the arm 15c is formed with a bore 15g.

The upper part of the cylindrical member 15a is inserted with a stopper ring 15h to prevent the cylindrical member 15a from escaping downward through the central opening 16a of the gear wheel 16. The cylindrical member 15a is inserted into and passes through the central opening 16a of a gear wheel 16 constituting a means for setting transmission ratio. The gear wheel 16 is fitted into the inner bore of a rolling bearing 17 fitted in the mounting member 13e, thereby the cam follower 15 is disposed to be rotatable coaxial with and upon the spool 14 with the upper end of the pin 15d in contact with the lower face of the spool 14.

A pin 18 is attached to the gear wheel 16 and inserted through the hole 15g bored in one free end of the arm 15c of the cam follower 15 for transmitting rotation of the gear wheel to the cam follower.

The gear wheel 16 is driven in rotation by a pulse motor 19 via a gear wheel 20 attached to the rotating shaft of the pulse motor 19.

The spool 14 is maintained at its neutral position with its lands 14a and 14b blocking the oil passage 13l and 13m of the valve housing 13, respectively, where the contacting piece 15f of cam follower 15 is located at the middle part of the inclined cam face 11b of the precess cam 11. Subsequent descending of the cam follower 15 accompanying downward movement of the spool 14 shifts the spool valve means 10 to a first switching position. On the other hand, elevating of the spool initiated by the cam follower 15 will shift the spool valve means to its second switching position, placing the oil passage 13k in communication with the oil passage 13l and the oil passage 13n with the oil passage 13m, respectively.

At the neutral position of the spool, there are provided clearances each at the top and bottom of the valve, namely, between the top face of the spool 14 and the top face or ceiling of the recessed portion 13b of the top cover 13c and between the bottom face of spool 14 and the upper face of the bottom cover 13d, and these clearances $t_1$ and $t_2$ are set to have enough length such that the flow rate characteristics of the operating oil supplied to the oil passage 13l or 13m of the valve housing 13, through the oil piping 13p from the pressurized oil source, oil passage 13k and the annular groove defined between the two lands 14a and 14b of the spool 14, can saturate. The support structure 6, precess cam 11, cam follower 15 and spool 14 constitute a mechanical feedback means.

The control means C is supplied with various signals given from a vehicle speed detector 21 for detecting the rate of rotation of the output disc 3 and sending a signal corresponding to the vehicle speed as transmission control information, from a throttle opening detector 22, from a driving mode selection switch 23 and from a shift position detector 24. These signals are processed to control the pulse motor 19 to obtain a desired transmission ratio.

Operation of the device of this embodiment as described above, is as follows. Supposing that the vehicle is stopped, and the transmission is set at its maximum decelerating position ready for starting the vehicle with both power rollers 4 and 5 being meshed with the reduced diameter portion of the input disc 2 and with the most widened diameter portion of the output disc 3.

At this maximum decelerating position, the contacting piece 15f of the cam follower 15, as shown in FIG. 2, is located substantially at middle part of the inclined cam face 11b. Because the spring 15e is set stronger than the spring 14e, the cam follower 15 and the spool 14 normally move together and the spool 14 is maintained at its neutral position, and the communication between the oil passages 13k, 13l and the 13m is interrupted. The piston cylinder arrangements 9a through 9d are thus balanced and the support structures 6 and 7 are kept at their neutral position.

If a driver tries to start the vehicle from a dead stop by selecting the drive range in the shift lever, depressing the acceleration pedal and letting the clutch in half engagement, the control unit will conduct the necessary processing based on the shift position detecting signal S, driving mode selection signal P, throttle opening detection signal U due to the depression of the pedal and the rotation detection signal V of the output disc 3 of the infinitely variable transmission T to determine the necessary amount of movement of the cam follower 15 and will generate an output pulse signal to actuate the pulse motor M to rotate in a clockwise direction seen in a plan view.

Since the torque of the pulse motor 19 is transmitted to the cam follower 15, through the gear wheel 20 and the gear wheel 16, the cam follower 15 will rotate in anti-clockwise direction.

The anti-clockwise rotation of the cam follower 15 lets the contacting piece 15f descend along the inclined face 11b of the precess cam 11 and results in the lowering of the cam follower 15. In response, the spool 14 will also descend to its first switching position, wherein the operating oil from the pressurized oil source is supplied to the oil cylinders 9a and 9d, through the oil piping 13p, piping socket 13g, the oil passage 13k, the annular groove between the lands 14a and 14b of the spool 14, oil passages 13m, piping socket 13i and the distribution pipe 13r. At the same time, the operating oil in the oil cylinder 9b and 9c is discharged to the oil tank through the channel, the distribution piping 13q, piping socket 13h, the oil passage 13l, the annular groove defined between the lands 14a and 14c of the spool 14, the oil passage 13j, the piping socket 13f and the oil distribution pipe 13o. Accordingly, the piston and cylinder arrangements 9a and 9d are extended, thereby the support structure 6 is raised and the support structure 7 is lowered. Let us suppose at this state that the input disc 2 is rotated anti-clockwise as shown in FIG. 2, and the power rollers 4 and 5 initiate precess movement to speed-up the vehicle.

Under this condition, the precess cam 11 is also raised, accompanying upward movement of the cam follower 15, as the support structure 6 moves upward.

The upward movement of the cam follower 15 makes the spool 14 elevate, thereby the oil passages 13l and 13m are closed by the lands 14a and 14b, and thus the extending movement of the piston and cylinder arrangements 9a and 9d stops and the support structures 6 and 7 are held at a position displaced upward from the neutral position. Accordingly, the power rollers 4 and 5 can continue precess movement toward the accelerating side, and by virtue of the precess movement of the support structure 6, the precess cam 11 rotates anticlockwise as seen in the plan view such that the inclined cam face 11b can trace the contacting pieces 15f of the cam follower 15.

As soon as the inclined cam face 11b engages the contacting piece 15f of the cam follower 15, the cam follower 15 is raised. Thereby the spool 14 starts to be raised from the neutral position to the second switching position, then the remaining piston and cylinder arrangements 9b and 9c are extended to shift the support structures 6 and 7 to the neutral position.

By virtue of this movement, the precess cam 11 moves downward and spool 14 is lowered again to the neutral position via the cam follower 15, and the support structures 6 and 7 return to the neutral position by repeating the above-mentioned motion, the contacting piece 15f of the cam follower 15 engages almost the middle portion of the inclined cam face 11b of the precess cam 11, and thus the transmission action of the toroidal type infinitely variable transmission T is completed. Practically, transmission action can be accomplished in a single action by being converged to the neutral position without repeating above-mentioned motion, if the spool valve is arranged in such a manner that the annular groove between the lands 14a through 14d can be placed in slight communication with the annular grooves of the oil passages 13l and 13m at the neutral position, in other words, if arranged as a so-called under lap spool valve.

When the moving vehicle is to be stopped and, by depressing the brake concurrent with releasing the accelerator pedal, the control means C detects such motion and generates a signal for the toroidal infinitely variable transmission T to return the transmission to its maximum decelerating position.

Accordingly, the pulse motor 19 is rotated anti-clockwise and rotates the cam follower 15 clockwise resulting in engagement of its contacting piece 15f with the upper cam face 11c.

As a consequence, the spool 14 is raised from its neutral position toward the second switching position to extend the oil cylinders 9b and 9c.

Since the support structures 6 and 7 are lowered from their neutral position, the power rollers 4 and 5 are rotatably tilted toward their decelerating side. As a result, the precess cam 11 will rotate clockwise so that the inclined cam face 11b can trace the contacting piece 15f of its cam follower 15, thereby the power rollers 4 and 5 can revert back to the maximum decelerating position.

If the support structure 6 descends further together with the precess cam 11 and urges the cam follower 15 to move downward over the clearance $t_2$, the spool will abut the bottom cover 13d and move no more, so the pin 15d will move away from the lower face of the spool 14 and there never arise any excess downward displacement over the extend of the clearance $t_2$.

On the contrary, if the support structure 6 is raised, thereby the precess cam 11, the cam follower 15 and the pin 15d will urge the spool 14 to move upward beyond the clearance $t_1$, the spool abuts the top cover 13c after having displaced the extent of the clearance, therefore the upward displacement of the cam follower 15 is excess of the clearance could be offset by the axial downward movement of the pin 15d in the cylindrical body portion 15a of the cam follower 15.

According to the first embodiment of the present invention as explained above, the maximum displacement of the spool 14 relative to the valve housing 13 in conducting transmission by means of the toroidal type infinitely variable transmission T, can be made within a minimum extend obtained by the sum of the clearance $t_1$ defined between the upper end face of the spool 14 and the supper face of recessed portion 13b of the top cover 13c added to the clearance $t_2$ defined between the bottom face of the spool 14 and the top face of the bottom cover 13d at the neutral condition as shown in FIG. 1. Accordingly, the displacement of the spool can be lessened together with the length as well as the weight of the spool 14, in addition the height between the lower face 11a and the upper cam face 11c also can be shortened. Moreover, transmission action cab be performed by merely rotating the cam follower 15 without shifting the valve housing 13 in axial direction, as a consequence, the entire construction of the transmission including the spool can be made smaller and lighter as well as the movable members, thereby the response characteristic of the device can be improved together with driving power for controlling.

Figure 4:
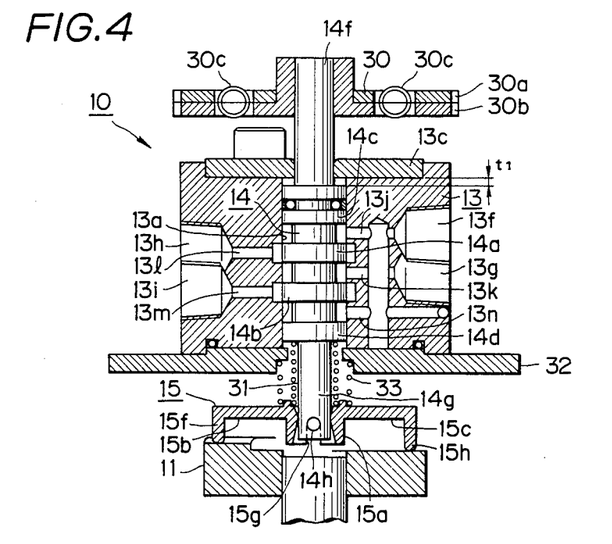
FIGS. 4 through 6 are enlarged views showing other embodiments of the present invention.

Next, explanation will be made on the second embodiment of the present invention, by referring to FIG. 4.

In the second embodiment, shafts 14f and 14g both extend in axial direction and are formed integral with the upper and lower ends of the spool 14. Shaft 14f is attached to a gear wheel 30 and a cam follower 15 is mounted upon shaft 14g for non rotating axial sliding movement on the shaft. A spring 31 is interposed between the lower face of a land 14d and the cam follower 15 to bias the spool 14 upwardly. A spring 33 for biasing the cam follower 15 toward the cam of the precess cam 11 is interposed between a mounting member 32 which also acts as a bottom cover and the top face of the cam follower 15. In this embodiment, the cam follower 15 is composed of a cylindrical member 15a fitted around the shaft 14g, a pair of arms 15b and 15c extending radially outwardly in symmetrically opposite directions from the upper end of the cylindrical member 15a. Contacting pieces 15f and 15h are formed at each free end of the arms, and a pin 14h passing through the shaft 14 is inserted in a slot 15g, thereby the cam follower 15 is slidable only in axial direction and is tiltable about the pin 14h. A gear wheel 30 includes an upper gear wheel 30a, a lower gear wheel 30b and a spring 30c interposed between the two gear wheels to prevent backlash between the gear members.

This is a structural feature of the transmission of the second embodiment, wherein the torque of the pulse motor 19 imparted by the rotation is transmitted to the gear wheel 30 and the rotational force of which is given to the cam follower 15, which engages at its contacting pieces 15f and 15h with the precess cam 11 and gives support to the spool 14 in a tiltable manner, so the spool 14 is, prevented from being affected by bending movement and can be displaced in axial direction by the mean valve of movements of both the contacting pieces 15f and 15h. Excessive axial movement of the cam follower 15 upward beyond the clearance $t_1$ is prevented from being transmitted by the upward sliding of the cylindrical member 15a along the shaft 14g due to the disengagement of the slot 15g from the pin 14h. Since construction of the device of this embodiment is almost the same as that of the first embodiment expecting the aforementioned feature, by rotating the gear wheel 30 anticlockwise seen from the upper side, both the cam follower 15 and the spool 14 descend and let the support structure 6 of the toroidal type transmission T rise up and the support structure 7 descend, thereby urge both the power rollers 4 and 5 to precess into their accelerating side.

By rotating the gear wheel 30 clockwise seen from the upper side of the figure, the cam follower 15 and the spool 14 will rise up and raises the support structure 6 up and let the support structure 7 descend thereby make the power rollers 4 and 5 to pivot toward the decelerating side.

Figure 5:
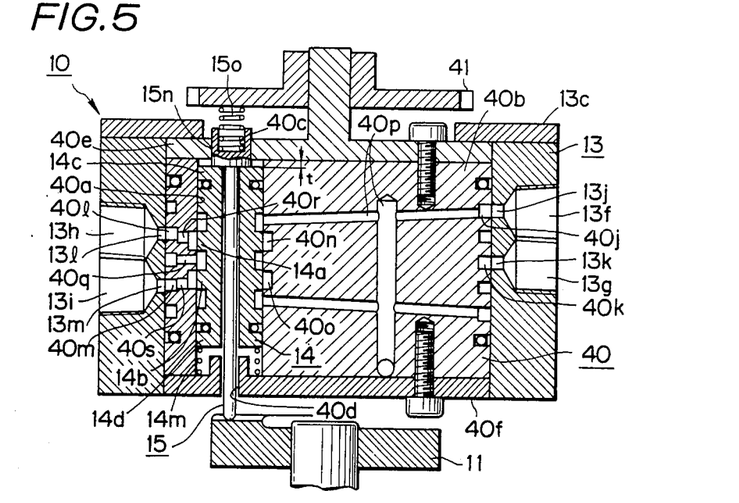

Next, the third embodiment of the present invention will be explained with reference to FIG. 5. This third embodiment is constructed in such a manner that a sleeve 40 is disposed rotatably within a valve housing 13 of large diameter, and a cylindrical spool 14 is slidably disposed within the sleeve and at the position where it can confront with the cam faces 11a through 11c of the precess cam 11, within the central opening of which a rod shaped cam follower 15 is slidably received.

The sleeve 40 consists of a sleeve proper 40b bored with a through hole 40a at a position eccentrical with respect to its outer periphery for inserting thereinto the spool 14, and a pair of cam follower guides 40e and 40f, each having a through hole 40c and 40d coaxial with the through hole 40a, are attached, respectively, to the upper face and lower face of the sleeve proper 40b. The sleeve proper 40b is provided at its outer periphery with a plurality of annular grooves 40j through 40m, which respectively confront oil passages 13j through 13m of the valve housing 13. In addition, sleeve 40b is provided, at its inner wall defining the through hole 40a, with annular grooves 40n and 40o each corresponding to the land 14a and 14b at their neutral position in the transmission. An oil passage 40p is bored between the annualar groove 40j and the annular groove defined between the two lands 14a and 14c and, between the annular groove defined by the lands 14b and 14d, and the opposite inner wall; an oil passage 40q is defined between the annular groove 40k and the inner wall defined between the lands 14a and 14b; an oil passage 40r is defined between the annular groove 40l and the annular groove 40n; and an oil passage 40s is provided between annular groove 40m and the annular groove 40o.

A gear wheel 41 to be meshed with the gear wheel 20 of the pulse motor 19 is integrally attached to the cam follower guide 40e.

The cam follower 25 is formed at its upper end with a spring receiving member 15n having a bore 40c which seats a spring 15o. The cam follower is guided by the bore 40d of the lower cam follower guide 40f so as to be slidable up and down and is biased, by spring 10o interposed between the bottom face of the gear wheel 41 and the spring receiving member 15n, toward the cam race of the precess cam 11.

The spool 14 is biased upwardly by a biasing spring 14m, disposed between the lower end face of the spool 14 and the cam follower guide 15f. Spring 14m is somewhat less in spring force than biasing spring 15o, such that its upper face to be engaged with the spring receiving member 15n.

Next, the operation of the device according to the third embodiment will be explained. In this embodiment, due to the fact that a pulse motor 19 is actuated by a control signal given by a control means C and thereby letting the rotary shaft of the pulse motor rotate through the required angle, the rotating force is transmitting to the sleeve 40 through the gear wheels 20 and 41, and thus the sleeve 40 rotates through the angle required to carry out the control.

As the lower face of the cam follower 15 descends (or rises) along the inclined cam face 11b of the process cam 11 is response to the rotation of the sleeve 40, the cam follower 15 will also descend (or rise), and the spool 14 will also descend (or rise) from the neutral position to the first switching position (or the second position) in response to the movement of the cam follower. As a consequence, the support structure 6 is raised (or lowered), while the support structure 7 is lowered (or raised), and the power rollers 4 and 5 are turned to their slantly oriented rolling position in accelerating (or decelerating) side, thereby an execution of a desired transmission ratio change relying on a toroidal type infinitely variable transmission T can be done in a manner similar to that performed by the above-mentioned first and second embodiments. Also in this embodiment, upward movement of the cam follower 15 beyond the clearance $t_1$ is not transmitted to the spool 14, since the upper end of the cam follower 15 will leave away from the top end of the spool 14.

Figure 6:
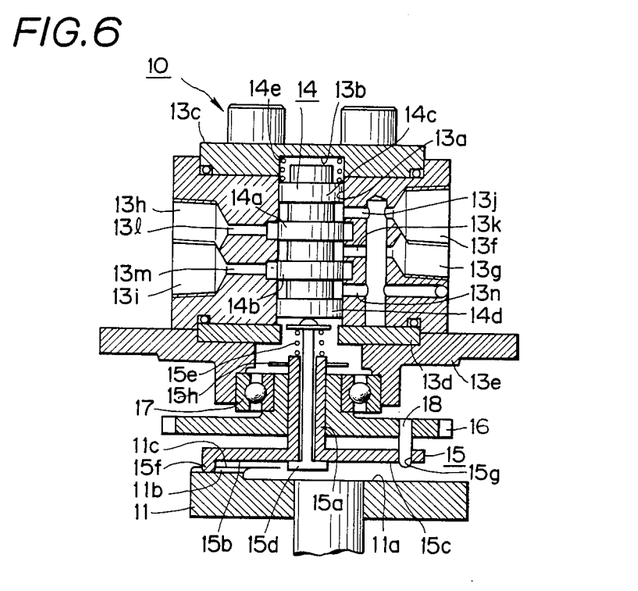

Next, the fourth embodiment of the invention will be explained by referring to FIG. 6.

Figure 7:
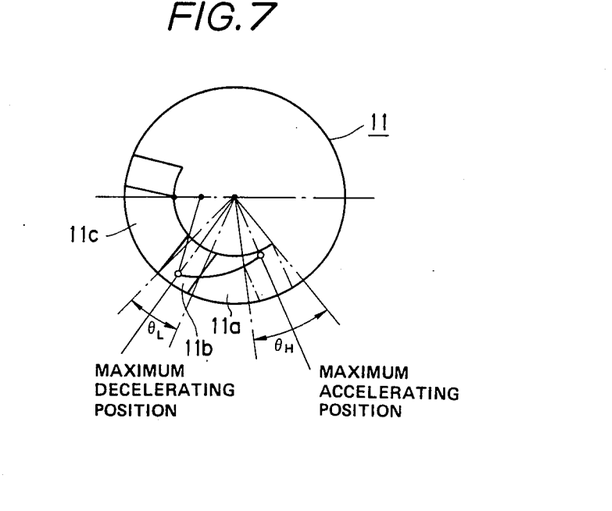
FIG. 7 is a plan view showing the locus of movement of the cam follower of the present invention on the process cam.

In the fourth embodiment, in contrast to from the embodiment 1, the rotational center of cam follower 15 is offset relative to the center of rotation of the precess cam 11 so that the contacting piece 15f of the cam follower 15 moves along a spiral locus with respect to the cam face of the precess cam 11, as shown in FIG. 7.

Figure 8:
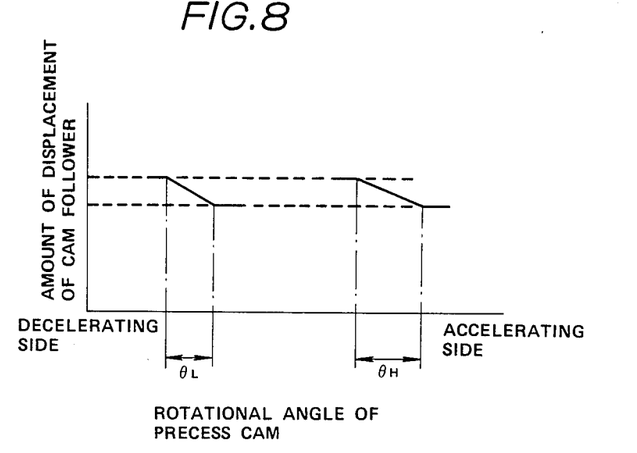
FIG. 8 is a schematic diagram showing the relation between the rotational angle of the precess cam and the amount of displacement of cam follower.

By virtue of this fourth embodiment, the device of the invention can provide another feature, in addition to that obtainable by the first embodiment. When a comparison is made on the toroidal type transmission T between the state where it is placed at its accelerating side and its decelerating side, the rotational angle of rotation $O_L$ of the contacting piece 15f of the cam follower 15 engaging the inclined cam face 11b of the precess cam 11 in the former state is less than the rotational angle of rotation $O_H$ obtained in the latter state, as shown in FIGS. 7 and 8.

Accordingly, inclination angle of the inclined cam face 11b of the precess cam 11 can be substantially varied dependant on the transmission ratio, thereby the sensitivity of the spool valve, namely the sensitivity of the transmission can be varied, thereby the sensitivity of transmission in its decelerating side can be enhanced, in addition, improved stability in its accelerating side can be secured.

Application of the feature obtained by the fourth embodiment shall not be limited only to the construction shown in this construction, but it goes without saying that it can be applied in such a manner that the rotational shaft of the cam follower 15 in the second and third embodiment can be offset with respect to the center of rotation of the precess cam 11.

Now, explanation also be made on the fifth embodiment of the invention, by referring to FIGS. 9 through 13 of the accompanying drawings.

Figure 9:
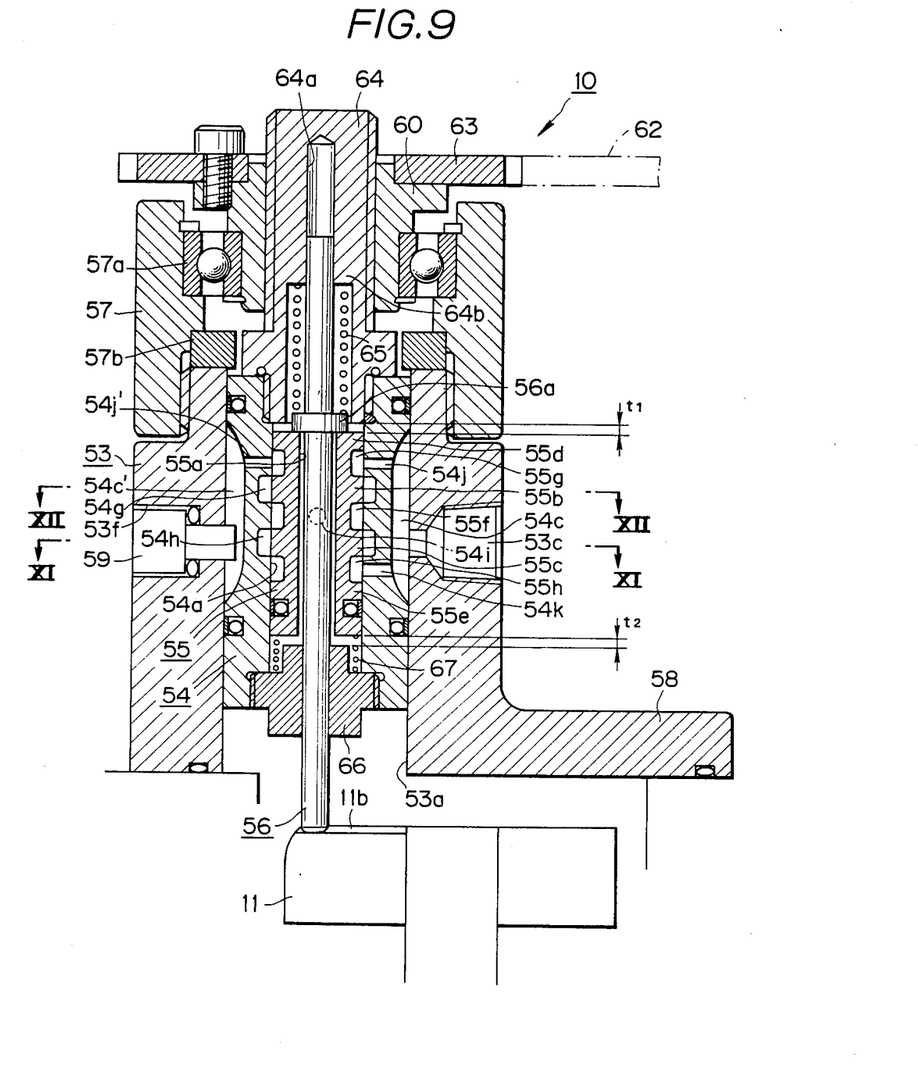
FIG. 9 is an enlarged sectional view of still further embodiment of the present invention at its reduced lowest speed.

Since the construction of the toroidal type infinitely variable transmission T and the control means C in this embodiment is entirely the same as those shown in the first, second, third and fourth embodiments, accordingly, those members are indicated in the drawings merely by placing the same corresponding numerals or symbols without repeating detailed explanation in the body of the specification, however, in this embodiment the height of the inclined face 11b, namely the step defined between the lower face 11a and the upper face 11c is set larger than the stroke of the movement of the spool and the transmission spool valve 10 is constructed as shown in FIG. 9 in enlarged scale.

A cylindrical sleeve 54 constituting a transmission ratio setting means is slidably only in an axial direction, in a central opening 53a of a cylindrical valve housing 53. Within the central passage 54a in sleeve 54 a cylindrical spool 55 is disposed, and a cam follower 56 is slidably disposed in the central opening 55a of spool 55.

A bearing housing 57 is mounted at the top of valve housing 53. Valve housing 53 is provided at its middle portion with four bored oil passages 53b through 53e and is formed with female thread 53f to threadably receive a set screw 59 which engages the inside wall of the oil passage groove 54c' to be used as a key for preventing rotation of the sleeve 54 within housing 53. The lower end of valve housing 53 has a radially projecting mounting flange 58, which is attached to the housing 1 of the toroidal type infinitely variable transmission T as shown in FIGS. 10 and 11.

Figure 10:
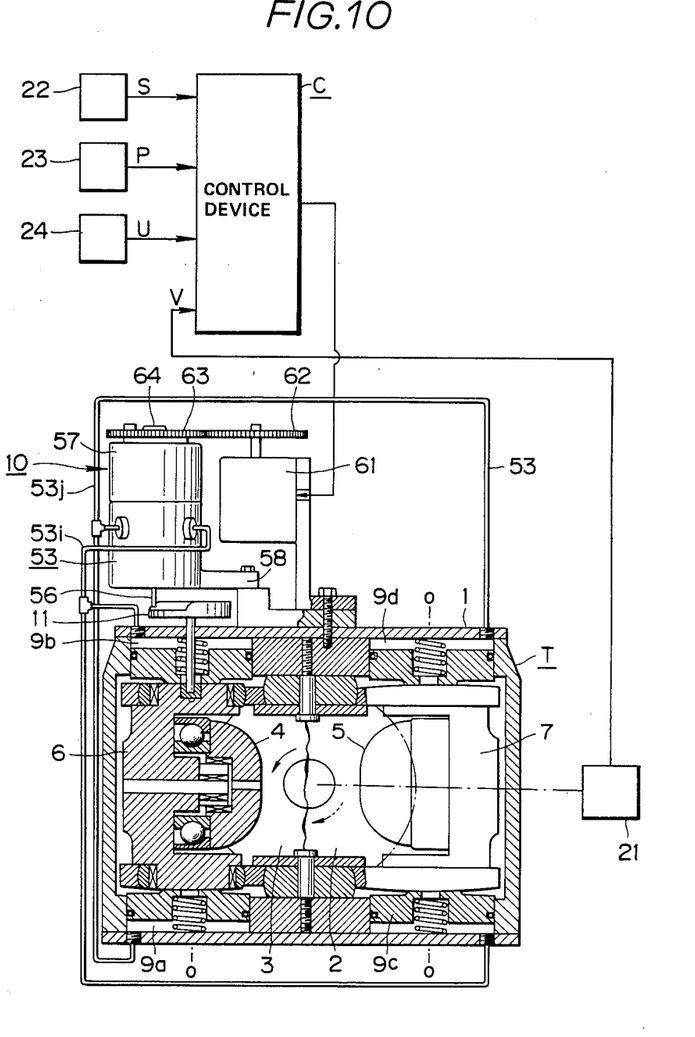
FIG. 10 is a partly sectioned elevation of the embodiment as shown in FIG. 9 applied to a toroidal disc type infinitely variable transmission.
Figure 11:
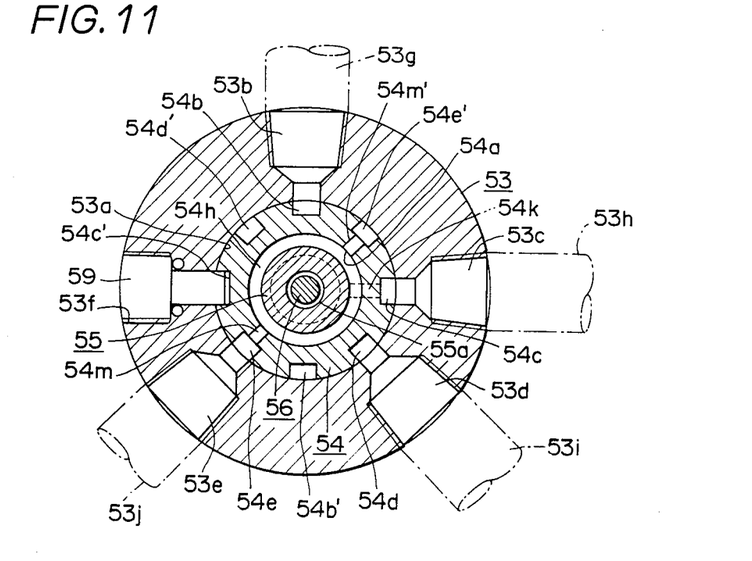
FIGS. 11 and 12, respectively, is a sectional view taken along line XI—XI and line XII—XII of FIG. 9.

Connection to passages 53b–53e is made as shown in FIG. 10, that is, the oil passage 53b is connected through an oil distribution pipe 53g to the source of pressurized oil placed outside, an oil passage 53c to an oil tank through a distribution pipe 53h. Oil passage 52d is connected to the piston cylinder arrangements 9b and 9c of the toroidal type infinitely variable transmission T through a distribution pipe 53i, and the oil passage 53e to a piston cylinder arrangements 9a and 9d of the toroidal type infinitely variable transmission T through a distribution pipe 53j, respectively.

Figure 12:
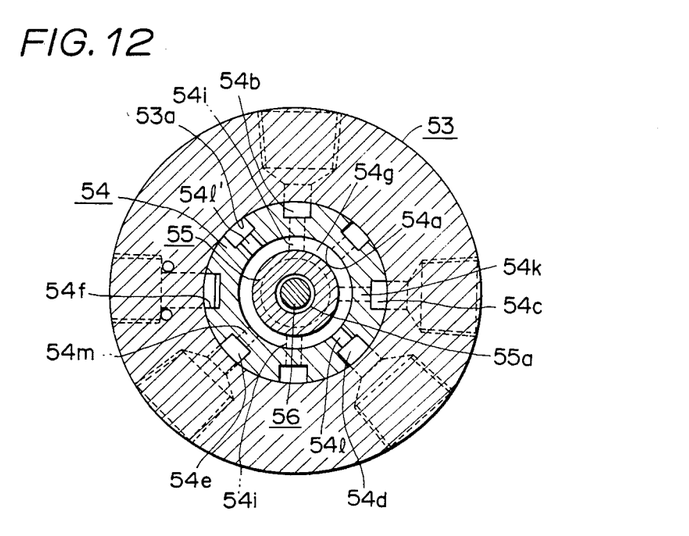

The sleeve 54 is provided at the positions facing with the oil passages 53b through 53e (the positions being symmetrical with each of said four oil passages with respect to the longitudinal axis) with a set of elongated oil passages 54b through 54e and the set of oil passages 54b' through 54e', respectively. In addition, the inside face of the sleeve 54 is formed with two annular grooves 54g and 54h axially spread apart at a desired distance and, between the two elongated grooves 54b and 54b' and the intermediate part of the inside wall situated between the annular grooves 54g and 54h, two oil passages 54i and 54i' are formed as shown in FIG. 12. Oil passages 54j, 54k and 54j' are formed, as shown in FIG. 9 between the elongated holes 54d, 54d' and the inside wall facing the two annular grooves 54g and 54h. Oil passages 54l and 54l' are formed as shown in FIG. 12, between elongated grooves 54d, 54d' and the annular groove 54g; and oil passages 54m and 54m' are formed, as shown in FIG. 11, between the elongated grooves 54e, 54e' and the annular groove 54h; respectively.

The spool 55 is formed with lands 55b, 55c and the other lands 55d, 55e at the position, confronting with the annular grooves 54g and 54h and the other positions outward the oil passage 54j and 54k, respectively. Accordingly, the elongated oil grooves 54b through 54e and the elongated grooves 54b' through 54e' being symmetrical with the former onee communicate with each other via the annular grooves 55f, 55h of the spool 55, the annular grooves 54g, 54h, oil passages 54i through 54m and 54i' through 54m' of the sleeve 54, respectively.

Bearing housing 57 is fitted on its inside face with a rolling bearing 57a and a stopper 57b for restricting upward movement of the sleeve 54.

A nut 60 is inserted into the space defined by the inner ring of the rolling bearing 57, onto the upper end of which a control gear 63 meshing with a gear wheel 62 coupled to the rotating shaft of a pulse motor 61 is tightly mounted. Threadedly engaged with the nut 60 is a threaded shaft 64, the lower end of which is threadably coupled to the upper end of the sleeve 54. The upper end of the cam follower 56 is slidably received within a central hole 64a bored axially in the thread shaft 64. A spring 65 biasing the cam follower downwardly is disposed between the shoulder 65b of the central hole 64a and the flange 56a of the cam follower 56.

A spool stopper 66 is threadedly mounted in the lower end of the sleeve 54, and a spring 67 urging the upper end of the spool 55 to the flange 56a of the cam follower 56 is disposed between the upper face of the stopper 66 and the lower end face of the spool 55. The spring 65 for urging the cam follower is selected to have a stiffness larger than that of the spring 67.

In this embodiment, the axial movement of the spool 55 is limited within a certain amount by the lower end of the threaded shaft 64 and the upper end face of the spool stopper 66. When the lower end of the cam follower 56 engages the cam face of the precess cam 11 and the spool valve is placed at its neutral position, the clearance $t_1$ is defined between the upper face of the spool 55 and the lower face of the threaded shaft 64, while the clearance $t_2$ is defined between the lower face of the spool and the upper face of the spool stopper 66 and these two clearances $t_1$ and $t_2$ are set almost the same. These clearances $t_1$ and $t_2$ are selected to have such sufficient length that the flow characteristic of the operating oil, supplied to the annular grooves 54g and 54h can saturate, under the condition, where the upper end of the spool 55 abuts the lower end of the threaded shaft 64 or the lower end of the spool 55 abuts the spool stopper 66. The operating oil is supplied from the source of the pressurized oil through the oil distribution pipe 53g, oil passage 53b of the valve housing 53, elongated oil grooves 54b and 54b', oil passages 54i and 54i' and the annular groove 55f between the lands 55b and 55c of the spool 55.

The support structure 6, precess cam 11, follower 56 and the spool 55 constitute a mechanical feedback means.

Next, the operation of the device will be explained. Suppose now, that the vehicle is stopped and the power rollers 4 and 5 are kept at the maximum decelerating position.

Under this condition, the cam follower 56 contacts on the lower cam face 11b, and the annular groove 55f between the lands 55b and 55c of the spool 55 is closed by the inside wall between the annular grooves 54g and 54h of the sleeve 54, as shown by FIG. 9, and the annular grooves 54g and 54h are closed by the lands 55b and 55c of the spool 55. As a consequence, the operating oil from the source is not supplied to the distribution pipe 53i and 53j and the support structures 6 and 7 are held at a neutral position.

If the vehicle is then started, the control means C will process the desired operation and outputs the information of the amount of motion of the sleeve 54 and outputs a pulse signal to actuate the pulse motor 61 to accelerating side.

Therefore, since the torque of the pulse motor 61 is transmitted to the nuts 60 via the gears 62 and 63, the threaded shaft 64 travels downward accompanying lowering of the sleeve 54.

If the power rollers 4 and 5 do not initiate pivoting even under this condition, the cam follower 56 still maintains its raised position as shown in FIG. 9, but the spool 55 will eventually contact the lower end of the threaded shaft 64 when the sleeve 54 descends by the predetermined length $t_1$, it descends further together with the lowering of the sleeve 54.

By virtue of the movement of the upper end of the spool 55 urged by the sleeve 54 toward the direction where it engages the lower end of the threaded shaft 64, the annular groove 55f of the spool 55 and the annular groove 54g of the sleeve 54 will communicate with each other. Pressurized operating oil from the source is then supplied to the oil distribution piping 53i and the annular groove 55h and 54h also are placed in communication with each other, thereby the oil in the distribution pipe 53j can be returned to the oil tank through oil distribution pipe 53h, and thus the piston cylinder arrangements 9b and 9c are extended together with the depression of the other piston cylinder arrangements 9a and 9d, resulting in lowering of the support structure 6 and concurrent rising of the other support structure 7.

Consequently, the precess cam 11 moves downward together with the cam follower 56. However, when the sleeve 54 travels downward in an amount larger than that of the support structures 6 and 7, the flange 56a on the cam follower 56 would leave the upper end of the spool 55, then the spool 55 can hold its position being displaced upward away from the neutral position relative to the sleeve 54. Let us suppose, if the input toroidal disc 2 starts rotation in anticlockwise direction as shown by the dash and dot line in FIG. 10, the power rollers 4 and 5 will start tilting toward their accelerating side, thereby the precess cam 11 will rotate clockwise seen in a plan view.

By virtue of this rotation of the precess cam 11, the cam follower 56 will descend slowly by being urged by the cam follower biasing spring 65.

At the first stage of the downward movement of the cam follower 56, there exists a clearance between the flange 56a and the upper end of the spool 55 equal to the length subtracting the clearance $t_1$ from the downward travel of the sleeve 54, the spool 55 does not travel downward until the clearance becomes zero, in spite of the descending of the cam follower 56, the position of the spool relative to the sleeve 54 remains unchanged.

When the flange 56a of the cam follower 56 contacts the spool 55, the spool 55 starts descending and at the moment the power rollers 4 and 5 arrive at the maximum accelerating position (immediately before the time when the lower end of the cam follower 56 engages the lower cam face 11a of the precess cam 11), the lands 55b and 55c of the spool 55 close the annular grooves 54g and 54h and interrupt the supply of pressurized oil to the oil cylinders 9b and 9c.

Figure 13:
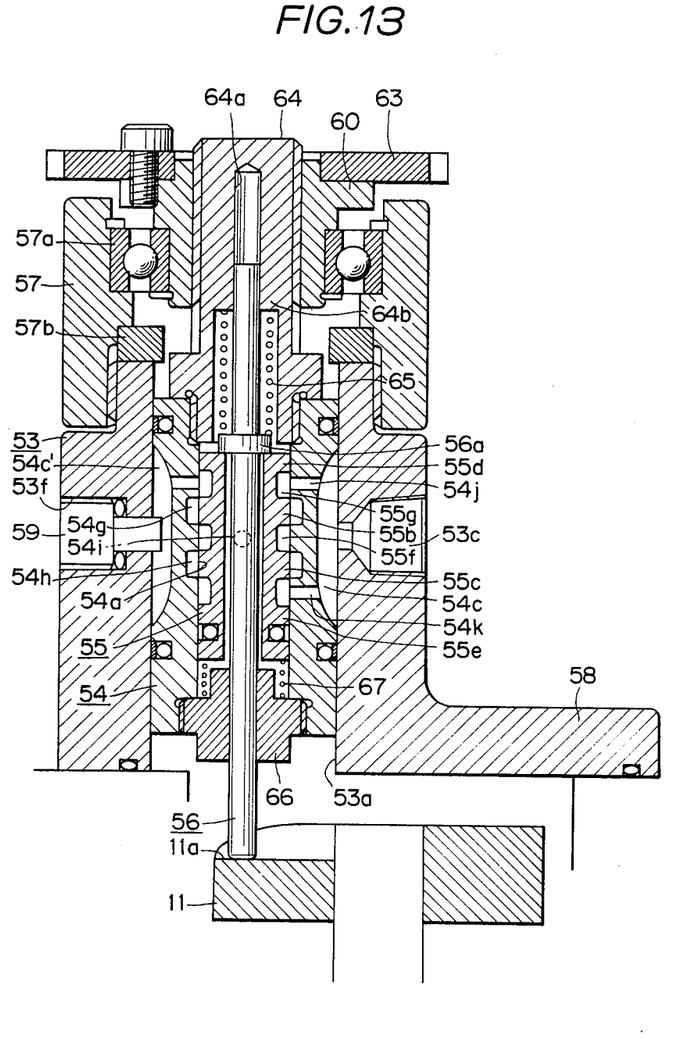
FIG. 13 is a sectional view of the device at its maximum speed-up position.

Under this condition, however, since the support structures 6 and 7 are deviated from their neutral position, the power rollers 4 and 5 still continue tilting and the cam follower 56 also travels downward. Thereby, the annular groove 55f of the spool 55 and the annular groove 54h of the sleeve 54 communicate with each other so as to extend the piston cylinder arrangement 9a and 9d, at the same time the annular grooves 55g and 54g are placed in communication, resulting in depression of the oil cylinders 9b and 9c. In response to this, the support structures 6 and 7 also rise upward together with the cam follower 56, and thus the lands 55b and 55c of the spool 55 block the annular grooves 54g and 54h, and by repeating these action the support structures 6 and 7 will return to their neutral position and complete the transmission ratio change to the maximum accelerating position, as shown in FIG. 13. In actual use, by providing under lap wherein there exist a slight extent of mutual communication between the annular grooves 54g, 54h, 55f, 55g and 55h at their neutral position, the changing action can be diverged to their neutral position by a single motion.

When the power rollers 4 and 5 are to be shifted from their maximum accelerating position as shown in FIG. 13 to the maximum decelerating position to stop the vehicle, the control means C is actuated to send a signal to reverse rotation of the pulse motor 61 to rise up the threaded shaft 64 move upward thereby to rise up the sleeve 54.

When the sleeve 54 moves upward, because the cam follower 56 is biased toward the precess cam 11 by the cam follower biasing spring 65, the spool 55 maintains its position as shown by FIG. 9 until the lower end of the spool 55 abuts the spool stopper 66, thereafter the spool 55, cam follower 56 and the sleeve 54 move upward together, and the lower end of the cam follower 56 leaves upward away from the cam face 11a of the precess cam 11.

Due to this movement, as the sleeve 54 proceeds upward, the annular groove 55f of the spool 55 and the annular groove 54h of the sleeve 54, and the annular groove 55g of the spool 55 and the annular groove 54g of the sleeve 54, respectively, are in communication with each other, thereby the pressurized oil piping 53g and the distribution oil piping 53j, and the pressurized oil piping 53h and the distribution oil piping 53i, respectively, are placed in communication. As a result, the piston cylinder arrangements 9a and 9d are supplied with operating oil, while the oil in the other set of piston cylinder arrangement 9b and 9c is exhausted, thus the support structure 6 is raised and the other support structure 7 is lowered.

By being initiated by the respective upward and downward movement of the support structure 6 and 7, both the power rollers 4 and 5 start tilting toward the decelerating side, that is, anticlockwise seen in plan view.

Since the support structures 6 and 7 also rotate accompanying the tilting of the power rollers 4, 5, the precess cam 11 rotates in an anticlockwise direction. When the power rollers 4 and 5 approach their decelerating position, the cam face of the precess cam 11 becomes engaged with the cam follower 56, and the cam follower 56 will rise up against the biasing action of the cam follower spring 65. In response, the spool 55 is also raised by the spring force given by the spring 67. When the power rollers 4 and 5 are tilted to the predetermined tilting angle 0, the spool 55 closes the distribution piping 53j, the pressurized oil piping 53g, and the distribution piping 53i and the pressurized oil piping 53i, thereby the movement of the support structures 6 and 7 are stopped. However, since the positions of the shifted support structures 6, 7 are offset from their neutral position, the power rollers 4 and 5 tilt further toward decelerating side, under this condition, since the spool 55 moves further beyond the neutral position with respect to the sleeve 54, the pressurized oil piping 53g and the oil distribution piping 53j, and the pressurized oil piping 53h and the distribution piping 53i again communicate with each other, respectively. Operating oil is thus supplied to the piston cylinder arrangements 9b and 9c, while the oil is discharged from the piston cylinder arrangements 9a and 9d, as a consequence the support structures 6 and 7 travel reverse toward the neutral position side.

Upon returning of the support structures 6, 7 to the desired neutral position, the power rollers 4 and 5 are stopped from the tilting motion, and the position of the spool 55 at this moment closes the pressurized oil piping 53g and oil distribution piping 53i, and the pressurized oil piping 53h and oil distribution piping 53j, respectively. Thus the change of transmission to the maximum decelerating position is completed. In this embodiment also, by adopting under lap of the annular grooves in actual operation, rising up of the spool 55 over the neutral position can be prevented and the speed change can be performed by a one action.

In executing a transmission ratio change, because the elongated oil grooves 54b through 54e and other group of elongated oil grooves 54b' through 54e' located to be symmetrical with each of the former grooves are communicated with each other, oil pressure applied to each of the two grooves in symmetry is always equal, thereby the oil pressure applied between the sleeve 54 and the housing 53 radially balances, therefore, smooth motion can be secured between the sleeve 54 and the housing 53.

As explained above, the amount of displacement of the spool 55 relative to the sleeve 54 in performing a transmission ratio change in a toroidal type infinitely variable transmission at maximum is maintained at the sum of the length of the clearance $t_1$ defined between the upper end of the spool 55 and the lower end of the threaded shaft 64, added with the clearance $t_2$ between the lower end of the spool 55 and the upper end of the spool stopper 66 at the neutral position, as shown in FIG. 9 or FIG. 13, that is the amount of displacement which is sufficient enough to make the flow characteristics of the operating fluid supplied to the oil cylinders 9a through 9d through the spool 55. Consequently the displacement of the spool 55 can be made considerably small and its length also can be made smaller together with a weight reduction. This enables the entire construction of the device as well as the moving parts of a small size and reduced weight, so the response characteristic is improved with less driving power necessary for control operation.

If any one of the elongated oil grooves 54f formed in the sleeve 54 is used also for preventing rotation, it brings about another merit to omit forming any particular groove for preventing rotation.

Moreover, by forming the elongated groove 54f in a shape different from that of other grooves 55b through 55e, other advantages can be obtained in preventing misfitting of the mating sleeve 54 and spool 55 from occurring in assembly which may cause phase shift of the communicating passages. In this instance, if one of the elongated oil grooves is used also to play a role for preventing sloppage rotation, it is preferred to make both the groove to be used for such purpose and the other oil groove is symmetry to have the same configuration so that balance of power in radial direction can be maintained between the sleeve 54 and the housing 53.

In explaining the fifth embodiment, a cam follower biasing spring is used as a resilient member for biasing the cam follower 56 toward the precess cam 11, however, any other resilient member such as rubber like material can be made.

In the fifth embodiment described above, the sleeve 54 is explained as being moved up and down by an actuating device composed of a gear wheel, a nut and a threaded shaft and converting rotation into linear motion, but it shall not be limited to such construction as explained and any other actuating means such as links, wires and rack and pinion or the like can be applied in the same sense, that is, any suitable means which can urge the sleeve 55 up and down in response to the signal from the transmission ratio control device is also applicable.

What is claimed is:

1. In a transmission control spool valve for a toroidal type infinitely variable traction roller transmission comprising:
    a pair of power rollers disposed between and in rotating engagement with a pair of coaxial input and output discs for varying the transmission ratio by changing their tilting angle, a pair of roller support structures for supporting said power rollers and being slidable in an axial direction, a rotatable, circular cam disc connected to at least one of said roller support structures, a fluid operated actuating means for slidably urging said roller support structure and cam disc in an axial direction;
    the improvement wherein said control spool valve comprises:
    a valve housing fixedly attached to a fixed member and incorporating therein fluid passages, a spool slidably disposed in said valve housing so as to control supply of pressurized fluid to said fluid operated actuating means, a rotatable cam follower disposed between said spool and said circular cam disc, a resilient member allowing said cam follower to travel in an axial direction with respect to said spool, and a transmission ratio setting means for relatively moving said cam follower along an inclined cam face of said cam disc in the rotational direction of said cam disc to achieve a desired relative location between said spool and said fluid passages.

2. The invention defined in claim 1 wherein the rotating center of the cam follower and the rotating center of the circular cam disc are on the same axis.

3. The invention defined in claim 1, wherein the rotating center of the cam follower and the rotating center of the circular cam disc are offset with each other.

4. The invention defined in claim 1, wherein the cam follower and the spool are slidable with respect to each other and are disposed coaxial with the center of rotation of the cam follower.

5. The invention defined in claim 1, wherein said cam follower and said spool are disposed coaxial with each other and are offset from the center of rotation of the circular cam disc.

6. The invention defined in claim 1, wherein the height of the cam face is set the same as the minimum stroke of the spool.

* * * * *